(12) United States Patent
Harris

(10) Patent No.: US 10,838,094 B2
(45) Date of Patent: Nov. 17, 2020

(54) OUTLIER DETECTION FOR IDENTIFICATION OF ANOMALOUS CROSS-ATTRIBUTE CLUSTERS

(71) Applicant: Matthew W. Harris, Magnolia, TX (US)

(72) Inventor: Matthew W. Harris, Magnolia, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 403 days.

(21) Appl. No.: 15/883,660

(22) Filed: Jan. 30, 2018

(65) Prior Publication Data

US 2018/0259661 A1    Sep. 13, 2018

Related U.S. Application Data

(60) Provisional application No. 62/469,733, filed on Mar. 10, 2017.

(51) Int. Cl.
| | | |
|---|---|---|
| *G06F 11/30* | (2006.01) | |
| *G01V 1/30* | (2006.01) | |
| *E21B 49/00* | (2006.01) | |
| *G01V 1/34* | (2006.01) | |

(52) U.S. Cl.
CPC .............. *G01V 1/301* (2013.01); *E21B 49/00* (2013.01); *G01V 1/307* (2013.01); *G01V 1/345* (2013.01); *G01V 2210/63* (2013.01); *G01V 2210/64* (2013.01); *G01V 2210/644* (2013.01); *G01V 2210/645* (2013.01)

(58) Field of Classification Search
CPC ...................................................... G01V 1/301
See application file for complete search history.

(56) References Cited

U.S. PATENT DOCUMENTS

| | | | |
|---|---|---|---|
| 4,646,240 A | * | 2/1987 | Serra .................... G01V 11/002 324/323 |
| 4,694,404 A | | 9/1987 | Meagher |
| 6,950,786 B1 | | 9/2005 | Sonneland et al. |
| 7,743,006 B2 | | 6/2010 | Woronow et al. |
| 2005/0120013 A1 | | 6/2005 | Chang et al. |

(Continued)

FOREIGN PATENT DOCUMENTS

WO    WO 2012/106201 A2    8/2012

OTHER PUBLICATIONS

Ester et al., (1996), A Density-Based Algorithm for Discovering Clusters in Large Spatial Databases with Noise, Proc. Of 2nd Intl. Conf. on Knowledge Discovery and Data Mining, 6 pages.

(Continued)

*Primary Examiner* — Phuong Huynh
(74) *Attorney, Agent, or Firm* — ExxonMobil Upstream Research Company—Law Department

(57) ABSTRACT

A method of identifying regions in a subsurface that may be a hydrocarbon reservoir, the method including: extracting features from cross-attribute clusters; assigning a distance metric and linkage criterion in feature space; calculating, with a computer, a degree of anomaly for the cross-attribute clusters in the feature space; ranking the cross-attribute clusters in accordance with the degree of anomaly; and prospecting for hydrocarbons by investigating a subsurface region in accordance with the rankings.

5 Claims, 4 Drawing Sheets

(56) References Cited

U.S. PATENT DOCUMENTS

| | | |
|---|---|---|
| 2007/0226158 A1 | 9/2007 | Wornow et al. |
| 2011/0218737 A1 | 9/2011 | Gulati |
| 2012/0090834 A1 | 4/2012 | Imhof et al. |
| 2013/0338927 A1 | 12/2013 | Kumaran |
| 2014/0278115 A1 | 9/2014 | Bas et al. |
| 2015/0253445 A1 | 9/2015 | Luo et al. |
| 2017/0192115 A1* | 7/2017 | Baker .................... G01V 1/307 |

OTHER PUBLICATIONS

Hastie et al., (2009), The Elements of Statistical Learning—Data Mining, Inference, and Prediction, Second Edition, Springer, p. 520.

MacQueen, J. B. (1967), Some Methods for classification and Analysis of Multivariate Observations, Proceedings of 5th Berkeley Symposium on Mathematical Statistics and Probability 1. University of California Press. pp. 281-297. MR 0214227. Zbl 0214.46201, Retrieved Apr. 7, 2009.

Meagher, D. (Oct. 1980), Octree Encoding: A New Technique for the Representation, Manipulation and Display of Arbitrary 3-D Objects by Computer, Rensselaer Polytechnic Institute (Technical Report IPL-TR-80-111), 121 pages.

Simoudis et al., (1996), A density-based algorithm for discovering clusters in large spatial databases with noise. Proceedings of the Second International Conference on Knowledge Discovery and Data Mining (KDD-96). AAAI Press. pp. 226-231, ISBN 1-57735-004-9. CiteSeerX: 10.1.1.71.1980.

Steinhaus, H. (1957), Sur la division des corps matériels en parties, Bull. Acad. Polon. Sci. (in French) 4 (12): pp. 801-804. MR 0090073, Zbl 0079.16403.

\* cited by examiner

OUTLIER DETECTION FOR IDENTIFICATION OF ANOMALOUS CROSS-ATTRIBUTE CLUSTERS

CROSS-REFERENCE TO RELATED APPLICATIONS

This application claims the benefit of U.S. Provisional Patent Application Ser. No. 62/469,733 filed Mar. 10, 2017 entitled OUTLIER DETECTION FOR IDENTIFICATION OF ANOMALOUS CROSS-ATTRIBUTE CLUSTERS, the entirety of which is incorporated by reference herein.

The present application includes subject matter related to U.S. patent application Ser. No. 15/380,117, filed Dec. 15, 2016, published as US2017/0192115 on Jul. 6, 2017, the entire contents of which are hereby incorporated by reference.

TECHNOLOGICAL FIELD

Exemplary embodiments described herein pertain generally to the field of geophysical prospecting, and more particularly to the identification of regions in the subsurface that may be petroleum reservoirs.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Petroleum is found in underground reservoirs. The petroleum industry seeks to efficiently identify untapped petroleum reservoirs, which are often also called 'hydrocarbon' reservoirs. Seismic data are often used to help locate new hydrocarbon reservoirs. Seismic data are images of the subsurface that are made using the reflections of seismic waves that have been propagated into the earth. In a typical seismic survey, seismic waves are generated by a source positioned at a desired location. As the source generated waves propagate through the subsurface, some of the energy reflects from subsurface interfaces and travels back to the surface, where it is recorded by the receivers.

Seismic interpreters are geoscientists who use seismic data to help describe layers and geologic structures in the subsurface. One of seismic interpreters' primary jobs is to identify regions in the subsurface that have a relatively high likelihood of being petroleum reservoirs. Conceptually, interpreters are trying to find trapped accumulations of hydrocarbons. A schematic diagram of an exemplary hydrocarbon reservoir 100 (vertically stripped region) is outlined in FIG. 1. The hydrocarbon reservoir 100 is an area under closure within a sandy reservoir layer 102, enclosed by a sealing fault 104 and shaley layers 101; the oil-water contact 103 is the lower boundary of the hydrocarbon accumulation.

In order to identify prospective regions, seismic interpreters comb through and compare many different seismic datasets, which are also known as seismic data 'volumes' because the dataset stores information about a three-dimensional volume under the surface of the Earth. As the seismic interpreters review the multiple seismic data volumes they look for subtle variations that indicate changes in rock and fluid properties of the subsurface material. Sometimes, seismic data are reprocessed to generate seismic attribute volumes. A seismic attribute is a piece of data that is associated with a certain feature of the subsurface (e.g., fluid content, rock texture, geometry of an interface between two different types of rock; refer to FIGS. 2A-C). More particularly, a seismic attribute, sometimes referred to as a "feature" in computer vision and pattern recognition literature, is a measureable property or derivative of seismic data used to highlight or identify areas or objects of geological or geophysical interest (e.g., the presence of hydrocarbons). These attributes are based on different characteristics of component seismic datasets. Attributes often correlate with some physical property of interest (e.g., acoustic impedance) and help geoscientists to see patterns that otherwise might go unnoticed. Such attributes can represent a transformation of seismic data to a form that is more useful to guide the search for hydrocarbon accumulations or indicate conditions that are potentially favorable to the accumulation of hydrocarbons. Different seismic attribute datasets are generated by processing the raw seismic reflection data in different ways.

In regions of the subsurface that are likely to be hydrocarbon reservoirs, seismic attributes have specific, geologically relevant spatial and contextual relationships. Building upon the example of the schematic attributes shown in FIGS. 2A-C, in a location where a hydrocarbon reservoir exists, we would expect to see reservoir rock (FIG. 2A) spatially coinciding with an attribute that reflects a change in fluid content (FIG. 2B); we would further expect one or two flat events (FIG. 2C) within the boundary of the reservoir, corresponding to the locations of the gas-oil fluid contact and/or the oil-water fluid contact. These geologically relevant spatial relationships are shown schematically in FIG. 3, in which a likely location of a hydrocarbon reservoir is identified by circle 301.

Standard methods for identification of prospective hydrocarbon reservoirs using multiple (≥2) seismic attribute datasets are time and work-intensive. An interpreter must manually scroll through multiple attribute datasets, each of which is extremely large (up to 100 GBs). As the interpreter reviews works, he or she must keep in mind subtle spatial variation in each of the many relevant attributes and mentally track the physical location and geologic context of all attribute objects.

A previously proposed automated approach is to use a graphical model as an integrator of different attribute data (see, for example, U.S. Patent Application Publication No. 2014/0278115, titled "Context Based Geo-Seismic Object Identification). Other methods for data fusion use weighted sums of normalized attribute values, such as the use of a Bayesian Belief Network (BBN) (see, for example, U.S. Pat. No. 7,743,006, titled "Bayesian network triads for geologic and geophysical applications") but such methods require that features within different seismic attribute volumes be spatially collocated.

A recent patent application titled "A Clustering Algorithm for Geoscience Data Fusion" (U.S. patent application Ser. No. 15/380,117, filed Dec. 15, 2016, published as U.S. Patent Application Publication No. 2017/0192115, the entirety of which is hereby incorporated by reference) describes a method for fusing multiple seismic attributes into a set of 'prospective' objects in the subsurface. These attributes are called cross-attribute clusters. Knowing the clusters can shift the interpreters' task from scanning through seismic volumes to screening the clusters. FIGS. 6A-6C in U.S. Publication No. 2017/0192115 illustrates vertical cross-sections of seismic attributes generated from a synthetic seismic data volume imaging a hydrocarbon system containing channelized-sand reservoirs. FIG. 6A illustrates Amplitude Strength (the 'anchor' attribute); FIG. 6B illustrates Near-vs-far amplitude-vs-offset; and FIG. 6C illustrates a 'flat event' attribute that identifies areas in which local geometry is horizontal relative to the Earth surface. In FIGS. 6A and B, darker shades indicate higher attribute values; in FIG. 6C, lighter/whiter color indicates higher attribute values. FIG. 7 in U.S. Publication No. 2017/0192115 illustrates a vertical cross-section of fused cross-attribute clusters of reservoir rock objects, flat-event objects, and AVO objects. The cross-section shown in this FIG. 7 is from the same volume but not the same location as the cross-sections shown in FIGS. 6A-6C.

The speed and quality of the screening process can be improved if the clusters are ranked so that the interpreter views the most prospective ones first. Common ranking systems might be to sort the clusters from largest to smallest or to sort based on a single measure of 'brightness'. A ranking system more consistent with the manual interpreter approach is to rank based on degree of anomaly—with the most anomalous being more highly ranked than the least anomalous.

SUMMARY

A method of identifying regions in a subsurface that may be a hydrocarbon reservoir, the method including: extracting features from cross-attribute clusters; assigning a distance metric and linkage criterion in feature space; calculating, with a computer, a degree of anomaly for the cross-attribute clusters in the feature space; ranking the cross-attribute clusters in accordance with the degree of anomaly; and prospecting for hydrocarbons by investigating a subsurface region in accordance with the rankings.

The method can further include: creating a hierarchical cluster tree with hierarchical agglomerative clustering and the distance metric and linkage criterion; a first cutting of the tree at a highest branch so that there are two clusters, each of which includes one or more cross-attribute clusters, the two clusters include all of the cross-attribute clusters and assigning a score to a smaller of the two clusters; a second cutting of the tree at one branch lower than the highest branch, so that there are three clusters including the two clusters from the first cutting, the smaller of the two clusters from the first cutting retains the score it was assigned and assigning another score to two remaining clusters from the second cutting; repeatedly cutting the tree one branch lower than an immediately preceding cut, retaining scores from preceding cuts of the tree, and assigning scores to smallest new clusters until a predetermined stopping criteria is met; and assigning any remaining unscored cross-attribute clusters a score.

In the method, the distance metric can be Euclidian distance, city-block distance, or Chebychev distance.

In the method, the linkage criteria can be farthest distance, shortest distance, or average distance.

In the method, the hierarchical cluster tree can be a dendrogram.

The method can further include: performing a seismic acquisition, results from which are used to generate the cross-attribute clusters; identifying subsurface regions that may be a hydrocarbon reservoir, wherein the subsurface regions are identified from the ranking of the cross-attribute clusters; and drilling a well for extracting hydrocarbons from the hydrocarbon reservoir.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement is a method for automatically ranking the cross-attribute clusters/prospective objects by degree of anomaly. Because objects that are most anomalous are called outliers, the present technological advancement can be based on an outlier detection algorithm. The method is robust to noisy and missing data, and it is easily modifiable when different attributes are used in the analysis. The method is efficient and scalable because operations can be done at the cluster level, not the pixel level.

Figure 1:
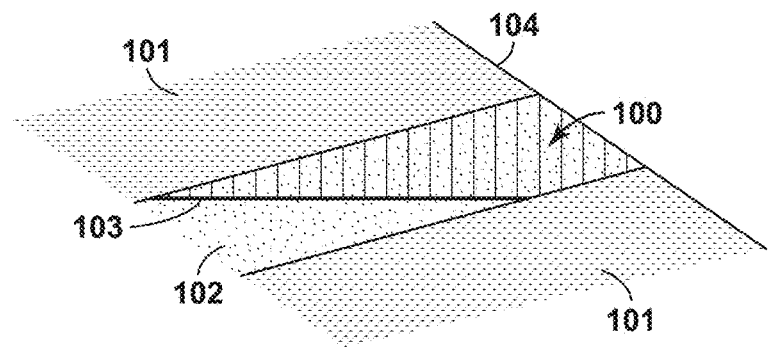
FIG. 1 is a schematic diagram of an exemplary hydrocarbon reservoir.
Figure 2A:
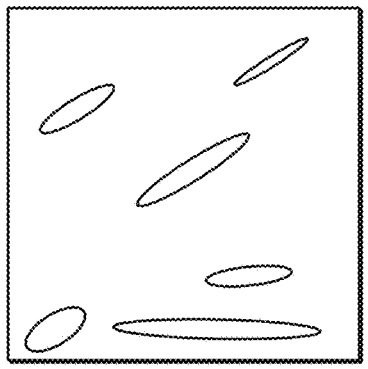
FIGS. 2A, 2B and 2C illustrate examples of seismic attributes.
Figure 2B:
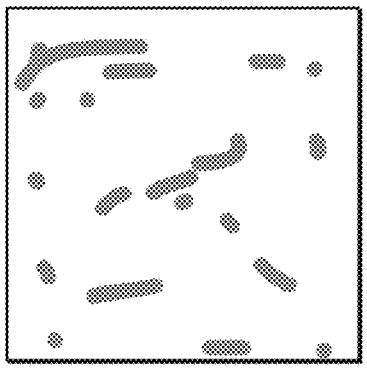
Figure 2C:
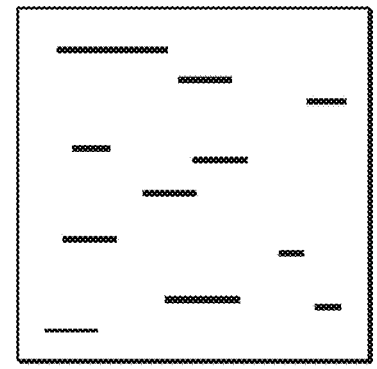
Figure 3:
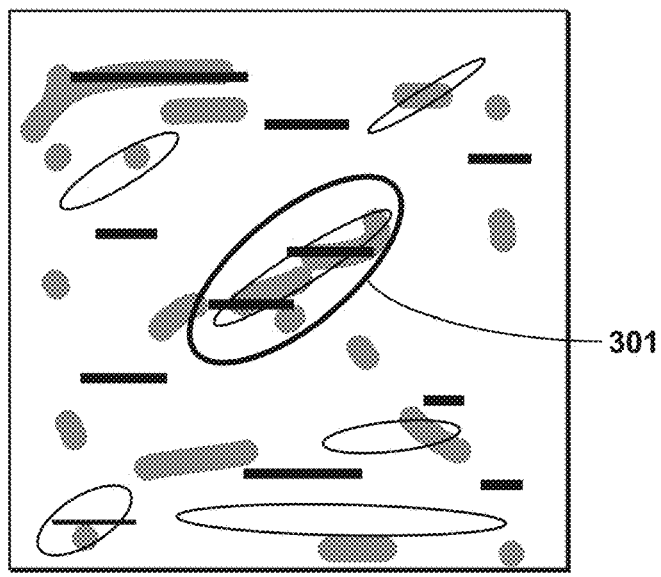
FIG. 3 is a schematic diagram of a hypothetical hydrocarbon reservoir and the corresponding spatial relationships between the seismic attributes schematically diagramed in FIGS. 2A, 2B, and 2C.
Figure 4:
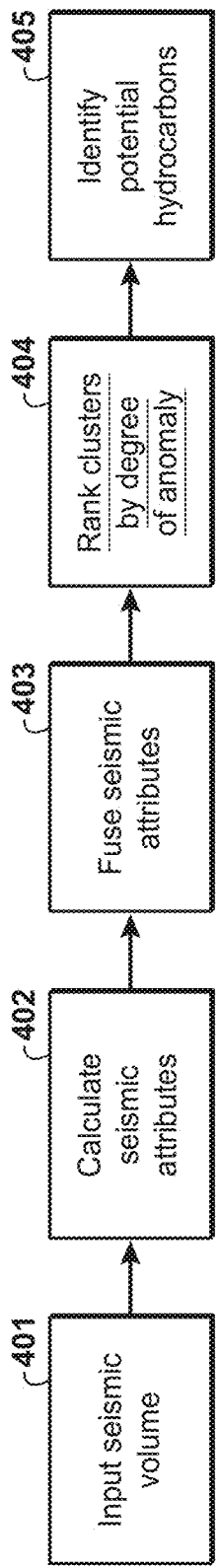
FIG. 4 illustrates a flow chart of seismic input to identification.

A method to rank cross-attribute clusters by degree of anomaly can be one component of a larger process as illustrated in FIG. 4. For brevity, and to prevent overloading the word 'cluster', cross-attribute clusters are henceforth referred to as objects. Step 401 can include inputting a seismic volume. Step 402 can include calculating seismic attributes. Step 403 can include fusing seismic attributes. Step 404 can include ranking clusters by degree of anomaly. Step 405 can include identifying potential hydrocarbons.

Figure 5:
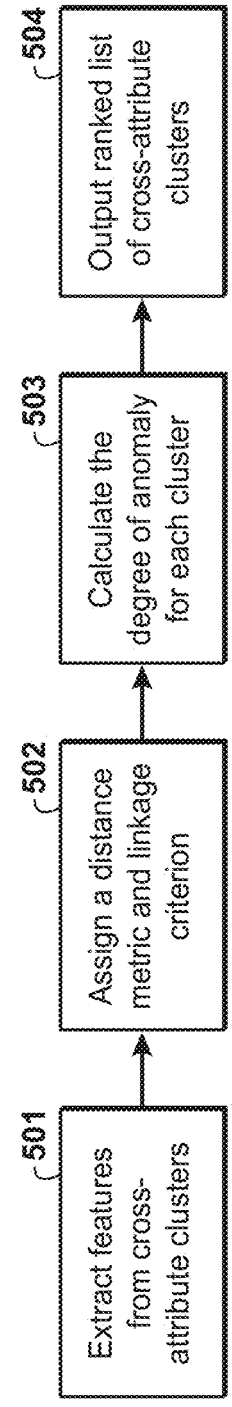
FIG. 5 illustrates a flow chart of how to rank clusters.

FIG. 5 illustrates an exemplary method of implementing step 404. Step 501 can include extracting features (or statistics) from each object. Step 502 can include assigning a distance metric and linkage criterion in the feature space. Step 503 can include calculating a degree of anomaly using a hierarchical agglomerative clustering algorithm. Step 504 can include outputting a ranked list of objects for identification of potential hydrocarbons.

The method illustrated in FIG. 5 can have one input (a set of N objects each composed of M attributes) and one output (a list of objects ranked by degree of anomaly).

Step 501 can include defining and extracting n features from all the objects. Features can be defined manually by the analyst or automatically using unsupervised machine learning techniques including but not limited to principal component analysis and convolutional neural networks. Because there are N objects and n features for each, there are a total of N*n features to be extracted. The effect of feature definition and extraction is data reduction—reducing each object from potentially millions of pixels in a seismic volume to n features.

Step 502 can include defining a distance metric and linkage criterion in the feature space. In the context of hierarchical agglomerative clustering, the distance metric measures the distance between each object in the feature space (see, FIG. 7). Each object can be a point in feature space. As an example, one can consider the four dimensional space illustrated in FIG. 7. There are 7 points on the graph; each is completely described by a four dimensional vector. The distance metric defines how one can measure the distance between each four dimensional vector. The linkage criterion measures the distance between sets (or clusters) of objects in the feature space. Once one has clustered some objects together (look at group of 701 in FIG. 7 and group 702 in FIG. 7), one needs to measure the distance between the clusters. In other words, what is the distance between the group 701 and group 702 in FIG. 7. There are several ways to do this: 1) one could take the distance between the two nearest objects in each set, 2) the two farthest objects in each set, 3) the distance between centers of the sets, etc.

Distance metrics include but are not limited to the Euclidean distance, city-block distance, and Chebychev distance. However, other distance metrics can be used. For features that are non-numeric, distance metrics include but are not limited to the Hamming distance and Jaccard distance. Linkage criteria include are but are not limited to the farthest distance, the shortest distance, and the average distance.

Figure 6:
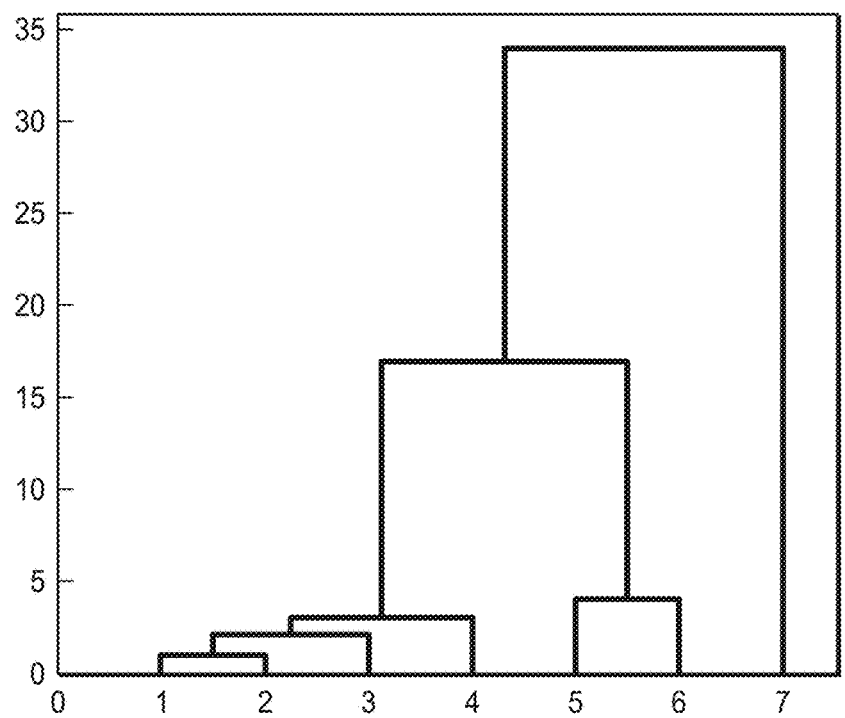
FIG. 6 illustrates a dendrogram for data contained in Table 1.

Step 503 can include calculating the degree of anomaly of each object in the feature space. This can be done through the following substeps:
  (a) Create a hierarchical cluster tree using hierarchical agglomerative clustering with the metric and linkage functions defined in Step 502. The tree can be displayed in a dendrogram (see FIG. 6);
  (b) Cut the tree at its highest branch so that there are two clusters. Each cluster contains one or more objects, and the two clusters together contain all objects. Assign a score of 1 to all objects in the cluster that is smaller;
  (c) Cut the tree one branch lower so that there are three clusters. The smaller cluster from the previous step remains the same and retains the score of 1. The larger cluster from the previous step is now two clusters. Assign a score of 2 to all objects in the smaller of these two clusters;
  (d) Repeatedly cut the tree lower, retain scores from the previous steps, and assign an incremental score (3, 4, etc.) to the smallest, new cluster. This process stops when a stopping criterion is met. Stopping criteria include but are not limited to i) specifying the maximum number of objects that can be assigned a score, ii) specifying the maximum percentage of objects that can be assigned a score, and iii) specifying an inconsistency coefficient for linkage heights; and
  (e) Assign all remaining unscored objects an incremental integer score.

Step 504 can include outputting a ranked list of objects for analysis and identification of potential hydrocarbons. The ranked list can follow from the degree of anomaly scored received in step 503. Those objects with a score of 1 are the most anomalous since they are the last to join the larger group; hence they are the first in the ranked list of objects. They are followed by those objects that received a score of 2, 3, and so on.

The following is an example of an application of the present technological advancement. While the example may be simplified for explanation purposes, the present technological advancement is certainly applicable to more complex scenarios.

For purposes of the example, there are seven objects and the objects are cross-attribute clusters where the attributes are an interior attribute, a flat event attribute, and an AVO attribute.

In the example, four features are manually defined per object (see step 501). The features are size of the interior reservoir attribute, average amplitude of the flat event attribute, and average amplitude of the AVO attribute. Table 1 contains feature data for the seven objects.

TABLE 1

Raw (synthetic) data for the example. There are seven objects (cross-attribute clusters) and four features.

|  | Feature 1 (Size) | Feature 2 (Reservoir Brightness) | Feature 3 (Flat Event Brightness) | Feature 4 (AVO Brightness) |
| --- | --- | --- | --- | --- |
| Object 1 | 10 | 0.10 | 0.10 | 0.10 |
| Object 2 | 9 | 0.15 | 0.05 | 0.12 |
| Object 3 | 12 | 0.08 | 0.10 | 0.15 |
| Object 4 | 15 | 0.12 | 0.12 | 0.08 |
| Object 5 | 32 | 0.55 | 0.30 | 0.28 |
| Object 6 | 36 | 0.50 | 0.25 | 0.35 |
| Object 7 | 70 | 0.80 | 0.82 | 0.78 |

Figure 7:
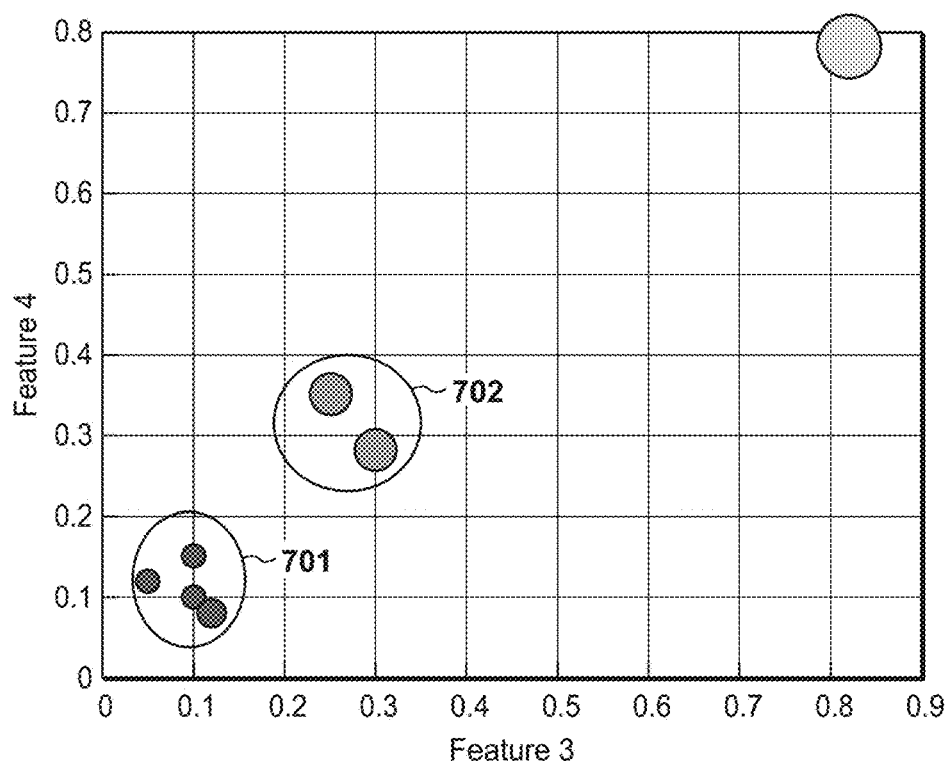
FIG. 7 is a scatter plot, or bubble chart, graphically depicting data contained in Table 1.

FIG. 7 illustrates the data of Table 1 graphically in a bubble chart. Based on FIG. 7, it is visually evident that there is one extremely anomalous object and two mildly anomalous objects.

Corresponding to step 502, the Euclidean distance metric between each of the 7 objects and shortest distance linkage is assigned.

A hierarchical cluster tree (see FIG. 6) is created (see step 503). Cutting this tree at the highest level yields two clusters. The smallest cluster contains only one object (object 7). Thus, object 7 is assigned a score of 1. The smaller of the two clusters contains two object—objects 5 and 6. Using a stopping criterion stating that at most 50% of the objects can be assigned a score, the process is stopped. All remaining objects are given a score of 3.

The objects can be ordered based on their score and placed into table 2 for the ranked list of objects (see step 504). Object 7, with a score of 1, is the most anomalous object. Objects 5 and 6, with a score of 2, are the next most anomalous. Objects, 1, 2, 3, and 4, with a score of 3, are deemed not anomalous.

TABLE 2

Ranked list of objects (cross-attribute clusters) associated with Step 504.

|  | Ranked List |
| --- | --- |
| Object 7 | 1 |
| Object 5 | 2 |

TABLE 2-continued

Ranked list of objects (cross-attribute clusters) associated with Step 504.

| | Ranked List |
|---|---|
| Object 6 | 2 |
| Object 1 | 3 |
| Object 2 | 3 |
| Object 3 | 3 |
| Object 4 | 3 |

Outlier Detection for Identification of Anomalous Cross-Attribute Clusters can rank objects (originally cross-attribute clusters) by the degree of their anomaly. The present technological advancement increases the effectiveness and efficiency of seismic interpreters, allowing them to quickly screen prospective regions in a seismic volume. The present technological advancement is fast (i.e., improves operation of the computer) since it operates at the object level—not the pixel level. The present technological advancement is easily adaptable to new features originating from an unsupervised machine learning algorithm or new features originating from new attributes.

Furthermore, the cross-attribute clusters and their rankings generated by the present technological advancement can be used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 8:
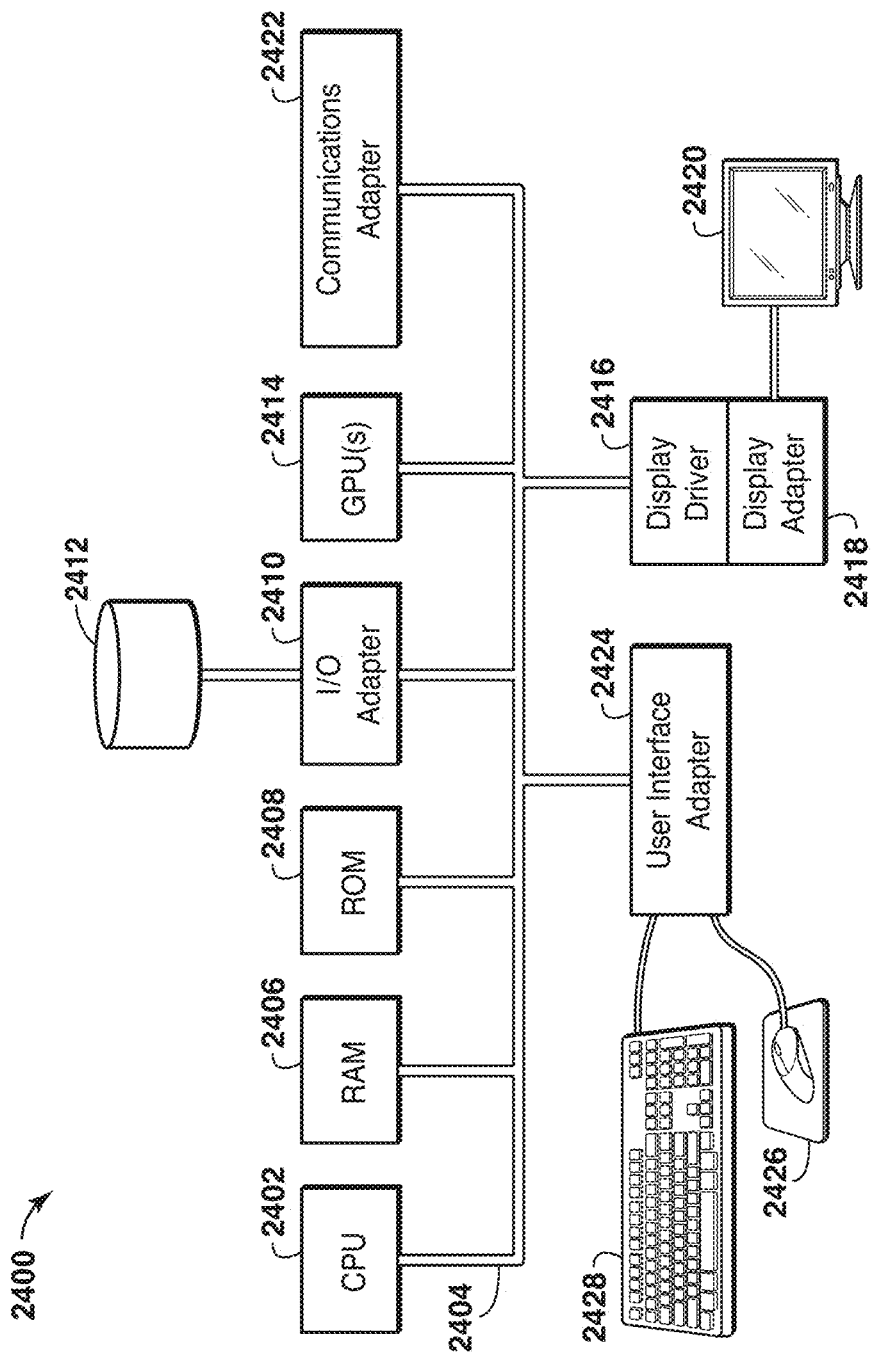
FIG. 8 is an exemplary computer upon which the present technological advancement may be implemented.

FIG. 8 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 8, additional CPUs may be present. Moreover, the computer system 2400 may comprise a networked, multi-processor computer system that may include a hybrid parallel CPU/GPU 2414 system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display driver 2416 and the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following publications are hereby incorporated by reference in their entirety:

Ester, Martin; Kriegel, Hans-Peter; Sander, Jorg; Xu, Xiaowei (1996), A Density-Based Algorithm for Discovering Clusters in Large Spatial Databases with Noise, Proc. Of 2nd Intl. Conf. on Knowledge Discovery and Data Mining;

Simoudis, Evangelos; Han, Jiawei; Fayyad, Usama M., eds. A density-based algorithm for discovering clusters in large spatial databases with noise. Proceedings of the Second International Conference on Knowledge Discovery and Data Mining (KDD-96). AAAI Press. pp. 226-231, ISBN 1-57735-004-9. CiteSeerX: 10.1.1.71.1980;

MacQueen, J. B. (1967). Some Methods for classification and Analysis of Multivariate Observations. Proceedings of 5th Berkeley Symposium on Mathematical Statistics and Probability 1. University of California Press. pp. 281-297. MR 0214227. Zbl 0214.46201, Retrieved 2009 Apr. 7;

Hastie, T. et al, "The Elements of Statistical Learning—Data Mining, Inference, and Prediction", Second Edition, Springer, 2009, p. 520;

Meagher, Donald (October 1980). "Octree Encoding: A New Technique for the Representation, Manipulation and Display of Arbitrary 3-D Objects by Computer", Rensselaer Polytechnic Institute (Technical Report IPL-TR-80-111); and Steinhaus, H. (1957). "Sur la division des corps matériels en parties". Bull. Acad. Polon. Sci. (in French) 4 (12): 801-804. MR 0090073, Zbl 0079.16403.

What is claimed is:

1. A method of identifying regions in a subsurface that may be a hydrocarbon reservoir, the method comprising:
    extracting features from cross-attribute clusters;
    assigning a distance metric and linkage criterion in feature space;
    calculating, with a computer, a degree of anomaly for the cross-attribute clusters in the feature space, wherein the calculating comprises:
        creating a hierarchical cluster tree with hierarchical agglomerative clustering and the distance metric and linkage criterion;
        a first cutting of the tree at a highest branch so that there are two clusters, each of which includes one or more cross-attribute clusters, the two clusters include all of the cross-attribute clusters and assigning a score to a smaller of the two clusters;
        a second cutting of the tree at one branch lower than the highest branch, so that there are three clusters including the two clusters from the first cutting, the smaller of the two clusters from the first cutting retains the score it was assigned and assigning another score to two remaining clusters from the second cutting;
        repeatedly cutting the tree one branch lower than an immediately preceding cut, retaining scores from preceding cuts of the tree, and assigning scores to smallest new clusters until a predetermined stopping criteria is met; and
        assigning any remaining unscored cross-attribute clusters a score;
    ranking the cross-attribute clusters in accordance with the degree of anomaly; and
    prospecting for hydrocarbons by investigating a subsurface region in accordance with the rankings.

2. The method of claim 1, wherein the distance metric is Euclidian distance, city-block distance, or Chebychev distance.

3. The method of claim 1, wherein linkage criteria is farthest distance, shortest distance, or average distance.

4. The method of claim 1, wherein the hierarchical cluster tree is a dendrogram.

5. The method of claim 1, further comprising:
    performing a seismic acquisition, results from which are used to generate the cross-attribute clusters;
    identifying subsurface regions that may be a hydrocarbon reservoir, wherein the subsurface regions are identified from the ranking of the cross-attribute clusters; and
    drilling a well for extracting hydrocarbons from the hydrocarbon reservoir.

* * * * *